(No Model.)
P. G. SIMPSON.
LATHE CARRIAGE.
No. 431,855. Patented July 8, 1890.
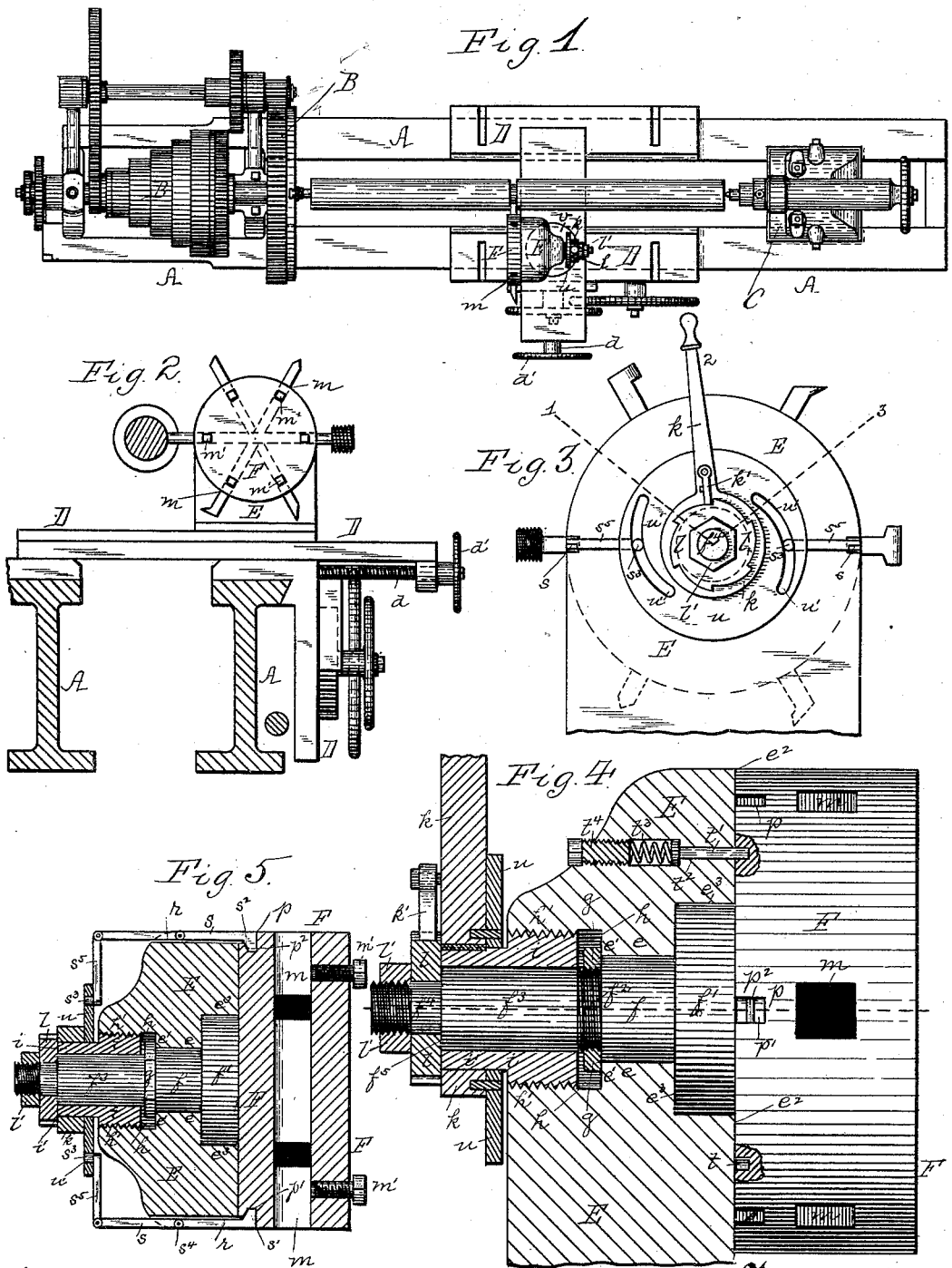
Witnesses:
J. N. Cooke
J. G. Kay
Inventor,
Peter G. Simpson
By James G. Kay
Attorneys

UNITED STATES PATENT OFFICE.

PETER G. SIMPSON, OF MILLVALE, ASSIGNOR, BY DIRECT AND MESNE ASSIGNMENTS, OF ONE-HALF TO HERMAN A. HEUPEL, OF ALLEGHENY, PENNSYLVANIA.

LATHE-CARRIAGE.

SPECIFICATION forming part of Letters Patent No. 431,855, dated July 8, 1890.

Application filed January 20, 1890. Serial No. 337,495. (No model.)

*To all whom it may concern:*

Be it known that I, PETER G. SIMPSON, a resident of Millvale borough, in the county of Allegheny and State of Pennsylvania, have invented a new and useful Improvement in Lathe-Carriages; and I do hereby declare the following to be a full, clear, and exact description thereof.

My invention relates to lathe-carriages and slide-rests for metal-working lathes, its object being to provide a suitable carriage and rest for the different lathe-work, in which the different tools to be employed may be brought into proper line to perform the desired work by the turning of a disk in the slide-rest, this disk carrying the several tools, and so overcome the necessity of removing the different tools from the slide-rest and adjusting the other tools in place each time a new tool is to be employed.

In my improved carriage and slide-rest I employ a disk mounted on a horizontal axis in the slide-rest and having seats for several different metal-working tools, so that whatever tool is desired may, by turning the disk, be brought into position for turning or cutting the metal supported on the head-stock or between it and the tail-stock of the lathe, and I provide means for locking and holding this disk in the desired position and supporting the tool in place when in use.

The particular improvements embodied in my invention will be hereinafter more particularly set forth and claimed.

To enable others skilled in the art to make and use my invention, I will describe the same more fully, referring to the accompanying drawings, in which—

Figure 1 is a plan view of a lathe having my invention applied thereto. Fig. 2 is a cross-section of the lathe, looking toward the disk carrying the tools. Fig. 3 is a rear view of the slide-rest. Fig. 4 is a vertical central section on a larger scale of the slide-rest, showing the disk carrying the tool in full lines; and Fig. 5 is a horizontal section of the slide-rest, showing the means for supporting the disk and sustaining the strain upon the tool when in use.

Like letters of reference indicate like parts in each.

The lathe-bed A, the head-stock B, and the tail-stock C can be of any suitable construction, and the tool-carriage can be mounted upon the lathe and fed along therein in any suitable way, these parts not forming any part of my invention. The head-stock B has the usual face or chuck for holding the work, such as are employed in this class of machinery.

Mounted on the carriage D of the lathe is the slide-rest E, this slide-rest having, as is usual in such parts of the lathe, a movement across the body thereof to feed the tools up to the work, and the mechanism for feeding forward the slide-rest shown being a screw-bar $d$, operated by the handle $d'$. The slide-rest E has formed therein the horizontal bearing $e$, and the disk F has the horizontal shaft or journal $f$ extending through the bearing $e$ and held therein by the nut $g$ pressing against the rear face of the bearing $e$.

The construction for these parts preferred by me is shown in the drawings, the disk F having a flat rear face fitting and bearing against the flat front face $e^2$ of the slide-rest, so as to obtain a strong bearing or support therefrom. The shaft $f$ has the ring or enlargement $f'$ close to the disk F fitting into a correspondingly-shaped recess $e^3$ in the slide-rest, thus serving to further support or brace the disk. The body of the shaft $f$ fits in the main portion $e$ of the bearing, and beyond this bearing $e$ the hole through the slide-rest is enlarged, as at $h$, and has the threaded portion $h'$ extending to the rear face of the slide-rest. Beyond its seat in the bearing $e$ the shaft $f$ has a short thread $f^2$, on which the nut $g$ screws, this nut bearing against the shoulder $e'$, formed by the enlargement of the bearing, and so holding the disk F in the slide-rest. The nut $g$ permits the very slight play of the disk, however, and so provides for the turning of the same when not locked. Beyond the main body $f$ of the shaft it is reduced in diameter, as at $f^3$, this reduced portion being cylindrical and extending through and somewhat beyond the threaded enlargement $h'$ in the slide-rest, and the end $f^4$ of the shaft is again reduced to form the shoulder $f^5$, being tapped to receive a nut $l'$. The thread $h'$ of the enlargement $h$ is rather coarse, so as to give a quick movement to the bushing $i$, screwing into it, for the purpose hereinafter described. This bushing $i$ fits around the portion $f^3$ of the shaft $f$, and has the extension $i'$ projecting beyond the rear face of the slide-rest, on which the lever $k$ is secured, this lever projecting upwardly in position for movement by the operator. The lever $k$ carries the pawl $k'$, which engages with the ratchet-washer $l$, fitting over the threaded end $f^4$ and against the shoulder $f^5$, and keyed in position on the end of the shaft, the nut $l'$ screwing against the rear face of the washer. The ratchet faces or teeth on the washer $l$ correspond to the number of tool-seats $m$ in the disk F, and the lever $k$, by its pawl $k'$, engages with the ratchet-faces to turn the disk in presenting a new tool in position for work. At the same time the lever screws the bushing $i$ into the slide-rest and leaves the disk free to be turned; but as the lever is drawn back the bushing is screwed out of the slide-rest against the washer $l$, and by pressure on this washer draws back the shaft $f$, and through it draws the disk F tight against the forward face $e^2$ of the slide-rest and holds it firmly in that position. The disk F carries the tools, the disk shown having seats $m$ for six tools, the seats being drilled axially therein, and any desired tools being secured therein, according to the work to be done. For example, the disk in the drawings, Fig. 2, carries a roughing-tool, a centering-tool, a square boring-tool, an ordinary boring-tool, a reamer, a tap, or any other ordinary metal-working tools. In using boring or reaming tools in the disk the slide-rest E is given a quarter-turn by means of the turn-table $v$ thereon and the tool secured thereto, and the tool in use is thus brought parallel with the axis of the lathe.

The tools may be held in place by set-screws $m'$ or other clamping devices.

In order to hold the disk rigidly in position and enable it to sustain the strain brought upon it in supporting the tools, I form in the periphery thereof seats $p$, the shape of which is more clearly shown in Fig. 5, and extending back in the slide-rest E in line with these seats are the grooves $r$, in which are pivoted the levers $s$, the forward ends of the levers entering the seat $p$ in the disk. The levers $s$ have the lugs $s'$ extending upwardly from the forward ends and having the inclined inner faces $s^2$, and the seats $p$ are formed correspondingly, the ends of the levers being received within the seats, and their inclined lugs $s'$ entering the recesses $p'$, having the inclined inner faces $p^2$. As said levers are forced inwardly, therefore, they not only bind upon the disk, but by the inclined lugs and seats force the disk more firmly against the face of the slide-rest, and so brace the disk at the outer edge thereof. The bodies of the levers fit neatly in the forward ends of the grooves $r$, and so brace the disk against twisting or rotary motion in either direction, so that the tool supported in the disk is held stationary and sustains the strain in whichever direction the work operated on is revolved. These levers $s$ are pivoted at $s^4$, and have the arms $s^5$ (rigid or hinged) at the rear end, which extend inwardly and engage by lugs $s^3$ with cam-grooves $u'$ in the cam-plate $u$. The cam-plate fits around the bushing $i$, and is secured to the lever $k$ and turns with it, and the grooves $u'$ therein are of such form that when the hand-lever $k$ is pushed forward to release and turn the disk the rear ends of the levers $s$ are drawn inwardly, so forcing outwardly the forward ends of the lever $s$ and releasing the disk and leaving it free to turn when the hand-lever engages with the ratchet.

In order to hold the disk in proper position and to prevent the turning thereof while it is being locked in position, I form on the rear face of the disk F a series of seats $t$, according to the number of tool-seats in the disk, and I provide a spring bolt or pin $t'$ to engage with said seats $p$, the spring-bolt fitting within a seat $t^2$ in the slide-rest E, in which seat is also confined the spring $t^3$, said seat being closed by the bolt $t^4$. One face of each seat $t$ is made at right angles to the rear face of the disk F, while the other face is inclined, and the end of the bolt $t'$ is correspondingly formed, and the bolt, when it enters the seat $t$, prevents the seat from turning in the direction in which the strain comes upon the disk in drawing back the lever $k$ to force the bushing $i$ against the ratchet-washer $l$.

When my improved tool is in use, the work having been adjusted in position between the head-stock and tail-stock or on the face-plate or chuck, and the carriage D being brought to the proper position, the operator turns the disk F until the desired tool is brought to position for work. This he accomplishes wholly by the hand-lever $k$, the normal position of which is marked 1 in Fig. 3, and in which position the bushing $i$ bears against the ratchet-washer $l$ and binds the disk against the slide-rest, and the cam-plate $u$ causes the levers $s$ to grip the disk, as described. The lever is thrown to the position marked 2, and in that movement screws in the bushing $i$ and draws out the levers $s$, so that the disk is free to turn. The pawl then engages with the ratchet-washer, and through it turns the disk to bring another tool into position, the lever reaching the point marked 3, when the spring-bolt $t'$ enters another seat $t$ and holds the disk in position until the lever is drawn back to its normal position. In its backward course the lever passes over one ratchet on the washer $l$ and travels part way over another one, as shown, and in so doing it screws out the bushing $i$ until it is forced with heavy pressure against the washer and causes a strong binding between the faces of the disk and slide-rest. It also, through the cam-plate $u$, causes the levers $s$ to enter the seats $p$ and grip the disk, as above described, so holding it firmly in position and enabling it to sustain heavy strain. Each tool can thus be brought into position for working, as may be desired, and when cutting or turning it is properly supported by the slide-rest, as above described, having as firm and solid a support as found in the ordinary slide-rest.

For certain kinds of work requiring the use of several different kinds of tool, the one after the other, the several tools can be arranged in the one tool-holding disk and the one tool brought into position after the other, thus saving the operator all the labor of removing the tool from the holder and inserting another one in its place, and also providing for the more perfect and accurate turning, as these tools can be accurately adjusted in the tool-holding disk, and each operation in turning be performed by its proper tool adjusted and supported in exactly the same way as the tool was upon the corresponding work on another bar, so giving greater accuracy of work and saving largely in time and labor to the operator.

What I claim as my invention, and desire to secure by Letters Patent, is—

1. In metal-working lathes, the combination of a slide-rest, a tool-holding disk on a horizontal shaft mounted in the tool-rest, said shaft having a slight longitudinal movement in its bearings, and a longitudinally-moving bushing or equivalent device acting on said shaft to draw the disk against the slide-rest, substantially as and for the purposes set forth.

2. In metal working lathes, the combination of a slide-rest having the tool-holding disk mounted on a horizontal shaft therein, said shaft having a slight longitudinal movement in its bearing, and a longitudinally-moving bushing or equivalent device acting to draw the disk against the slide-rest, substantially as and for the purposes set forth.

3. In metal-working lathes, the combination of the slide-rest E, tool-holding disk F, having the shaft $f$, and carrying the washer $l$, bushing $i$, screwing within the slide-rest and around the shaft $f$, and lever for turning said bushing, substantially as and for the purposes set forth.

4. In metal-working lathes, the combination of the slide-rest E, having the bearing $e$, the annular recess $e^3$, and the enlargement $h$, and the tool-holding disk F, having the shaft $f$, provided with the annular ring or enlargement $f'$, close to the disk and fitting within this recess $e^3$, and the reduced portion $f^3$, provided with a short thread $f^2$, and nut $g$, engaging therewith, the washer $l$, secured at the end of said shaft, and the bushing $i$, entering within the enlargement $h$ and having a longitudinal movement therein, substantially as and for the purposes set forth.

5. In metal-working lathes, the combination of the slide-rest having the grooves $r$, the tool-holding disk F, having recesses $p$, and the levers $s$, pivoted in said grooves $r$ and entering said recesses $p$, and having lugs $s'$, extending inwardly into the same, substantially as and for the purposes set forth.

6. In metal-working lathes, the combination of the slide-rest E, the tool-holding disk F on a horizontal shaft mounted in said slide-rest, the levers $s$, pivoted in the slide-rest and engaging with the disk, and the cam-plate $u$, engaging with said levers to operate the same, substantially as and for the purposes set forth.

7. In metal-working lathes, the combination of the slide-rest E, tool-holding disk F, having the shaft $f$, mounted in said slide-rest and carrying the washer $l$, provided with a ratchet-face, the bushing $i$, screwing within the slide-rest and around the shaft $f$, and the lever $k$, for turning said bushing, provided with a pawl engaging with said washer, substantially as and for the purposes set forth.

In testimony whereof I, the said PETER G. SIMPSON, have hereunto set my hand.

PETER G. SIMPSON.

Witnesses:
JAMES I. KAY,
J. N. COOKE.